United States Patent
Flagg et al.

(10) Patent No.: US 9,658,695 B2
(45) Date of Patent: May 23, 2017

(54) SYSTEMS AND METHODS FOR ALTERNATIVE CONTROL OF TOUCH-BASED DEVICES

(71) Applicants: Matthew Flagg, San Diego, CA (US); Jeremy Barrett, Atlanta, GA (US); Scott Wills, Mountain View, CA (US); Sean Durkin, Encinitas, CA (US); Vinod Valloppillil, San Francisco, CA (US)

(72) Inventors: Matthew Flagg, San Diego, CA (US); Jeremy Barrett, Atlanta, GA (US); Scott Wills, Mountain View, CA (US); Sean Durkin, Encinitas, CA (US); Vinod Valloppillil, San Francisco, CA (US)

(73) Assignee: CUESTA TECHNOLOGY HOLDINGS, LLC, Mountain View, CA (US)

( * ) Notice: Subject to any disclaimer, the term of this patent is extended or adjusted under 35 U.S.C. 154(b) by 0 days.

(21) Appl. No.: 14/075,742

(22) Filed: Nov. 8, 2013

(65) Prior Publication Data

US 2014/0125590 A1 May 8, 2014

Related U.S. Application Data

(60) Provisional application No. 61/724,248, filed on Nov. 8, 2012.

(51) Int. Cl.
*G06F 3/01* (2006.01)
*G06F 3/0488* (2013.01)
(Continued)

(52) U.S. Cl.
CPC ............ *G06F 3/017* (2013.01); *A63F 13/213* (2014.09); *A63F 13/2145* (2014.09); *A63F 13/26* (2014.09); *G06F 3/0488* (2013.01)

(58) Field of Classification Search
CPC ......... G06F 3/017; A63F 13/213; A63F 13/06
(Continued)

(56) References Cited

U.S. PATENT DOCUMENTS 7,278,115 B1 * 10/2007 Conway .............. G06F 3/04815
345/418
8,363,009 B1 * 1/2013 Queru ................. G06F 3/04883
345/1.2

(Continued)

*Primary Examiner* — Chanh Nguyen
*Assistant Examiner* — Robert Stone
(74) *Attorney, Agent, or Firm* — Clements Bernard Walker PLLC; Lawrence A. Baratta, Jr.; Christopher L. Bernard

(57) ABSTRACT

A computer-implemented method, a system, and software includes providing output from a touch-based device to an external display; detecting gestures from a user located away from and not physically touching the touch-based device; and translating the detected gestures into appropriate commands for the touch-based device. The systems and methods provide alternative control of touch-based devices such as mobile devices. The systems and methods can include a mobile device coupled to an external display device and controlled via user gestures monitored by a collocated sensor. Accordingly, the systems and methods allow users to operate applications ("apps") on the mobile device displayed on the external display device and controlled without touching the mobile device using gestures monitored by the collocated sensor. This enables the wide variety of rich apps to be operated in a new manner.

13 Claims, 9 Drawing Sheets

(51) Int. Cl.
*A63F 13/26* (2014.01)
*A63F 13/213* (2014.01)
*A63F 13/2145* (2014.01)

(58) Field of Classification Search
USPC .......................................................... 345/156
See application file for complete search history.

(56) References Cited

U.S. PATENT DOCUMENTS

| | | | | |
|---|---|---|---|---|
| 2008/0267447 A1* | 10/2008 | Kelusky | ............. | G06F 19/3481 382/100 |
| 2008/0273015 A1* | 11/2008 | Huang | ................. | G06F 3/0416 345/173 |
| 2010/0053151 A1* | 3/2010 | Marti | ...................... | G06F 3/011 345/419 |
| 2010/0277489 A1* | 11/2010 | Geisner | ................. | G06F 3/011 345/581 |
| 2010/0281432 A1* | 11/2010 | Geisner et al. | ............... | 715/849 |
| 2011/0216002 A1* | 9/2011 | Weising | .................. | G09G 5/08 345/158 |
| 2011/0230178 A1* | 9/2011 | Jones | ................. | H04M 1/0235 455/422.1 |
| 2012/0017147 A1* | 1/2012 | Mark | .................... | G06F 1/1639 715/702 |
| 2012/0050183 A1* | 3/2012 | Lee | ....................... | G06F 3/1423 345/173 |
| 2012/0096394 A1* | 4/2012 | Balko | .................. | G06F 3/0482 715/790 |
| 2012/0098754 A1* | 4/2012 | Kim | .............................. | 345/173 |
| 2012/0169671 A1* | 7/2012 | Yasutake | ............... | G06F 3/0425 345/175 |
| 2012/0242800 A1* | 9/2012 | Ionescu et al. | .................. | 348/46 |
| 2012/0275686 A1* | 11/2012 | Wilson | ............... | G06K 9/00355 382/154 |
| 2012/0309532 A1* | 12/2012 | Ambrus et al. | ................. | 463/36 |
| 2013/0082978 A1* | 4/2013 | Horvitz | .................. | G06F 3/017 345/175 |
| 2013/0086674 A1* | 4/2013 | Horvitz | .................. | G06F 21/32 726/19 |
| 2014/0337791 A1* | 11/2014 | Agnetta | ............... | G06F 3/0481 715/784 |

* cited by examiner

Input – Recordings of touches and screenshots serves as training data

Output – User Model to predict most likely touch interaction per screen

"Snap to" –
Cursor enters region of interest & is "snapped" to anchor

"Drag Region" –
Translates large hand movements into bounded, fine grained cursor movements when dragging objects

SYSTEMS AND METHODS FOR ALTERNATIVE CONTROL OF TOUCH-BASED DEVICES

CROSS-REFERENCE TO RELATED APPLICATION(S)

The present non-provisional patent application claims priority to U.S. Provisional Patent Application Ser. No. 61/724,248, filed Nov. 8, 2012, and entitled "SYSTEM AND METHOD FOR PROVIDING ALTERNATIVE CONTROL OF TOUCH-BASED APPLICATIONS," which is incorporated in full by reference herein.

FIELD OF THE DISCLOSURE

The disclosure relates to providing computer vision based control of touch-based applications to facilitate user control over a touch-sensitive mobile device via non-contact gesture based inputs by a user to complement viewing output from the mobile device on an external display device, such as a television or the like.

BACKGROUND OF THE DISCLOSURE

Touch-sensitive user interfaces for mobile devices, such as smartphones, tablets, and other mobile devices are known. These devices are proliferating and include, without limitation, iOS-based devices from Apple, Android-based devices from various manufacturers, Windows 8.x devices from Microsoft and other manufacturers, and the like. Furthermore, these devices can operate various applications ("apps") which offer rich user experience for games, social networking, education, entertainment, health & fitness, music, productivity, and the like. Additionally, processing power and capability for mobile devices is beginning to be on par with desktop and laptop computers. With the enhanced processing capabilities of these mobile devices, it is possible to provide display information to external display devices having much larger display areas than the mobile devices (e.g., televisions and/or other display devices). However, for a user to control the mobile device and display content from the mobile device on the external display, the user must either be relatively close to the display device, implement a long connection cord between the mobile device and the external display, and/or implement a wireless connection between the mobile device and the display device (which may not be provide sufficient performance). Conventional mobile devices do not provide for an alternative form of control (e.g., alternative to touch) for these types of uses.

BRIEF SUMMARY OF THE DISCLOSURE

In an exemplary embodiment, a computer-implemented method includes providing output from a touch-based device to an external display; detecting gestures from a user located away from and not physically touching the touch-based device; and translating the detected gestures into appropriate commands for the touch-based device to control the touch-based device without being in physical contact therewith. In another exemplary embodiment, a system includes a network interface, a data store, and a processor, each communicatively coupled therebetween; and memory storing instructions that, when executed, cause the processor to: provide output from a touch-based device to an external display; detect gestures from a user located away from and not physically touching the touch-based device; and translate the detected gestures into appropriate commands for the touch-based device to control the touch-based device without being in physical contact therewith. In yet another exemplary embodiment, software stored in a non-transitory computer readable medium includes instructions executable by a system, and in response to such execution causes the system to perform operations including providing output from a touch-based device to an external display; detecting gestures from a user located away from and not physically touching the touch-based device; and translating the detected gestures into appropriate commands for the touch-based device to control the touch-based device without being in physical contact therewith.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

In various exemplary embodiments, systems and methods are described providing alternative control of touch-based devices such as mobile devices. In an exemplary application, the systems and methods include a mobile device coupled to an external display device and controlled via user gestures monitored by a collocated sensor. Accordingly, the systems and methods allow users to operate applications ("apps") on the mobile device displayed on the external display device and controlled without touching the mobile device using gestures monitored by the collocated sensor. This enables the wide variety of rich apps to be operated in a new manner. In the various exemplary embodiments described herein, alternate control means replacing physical control of the mobile device with gesture-based control (i.e., not touching or moving the mobile device). That is, touches, swipes, rotation, angling, shaking, etc. is replaced with in-air gestures via hand movement, body movement, etc. The in-air gestures replace touches on the touch screen and movement of the mobile device via the accelerometer, etc.

Figure 1:
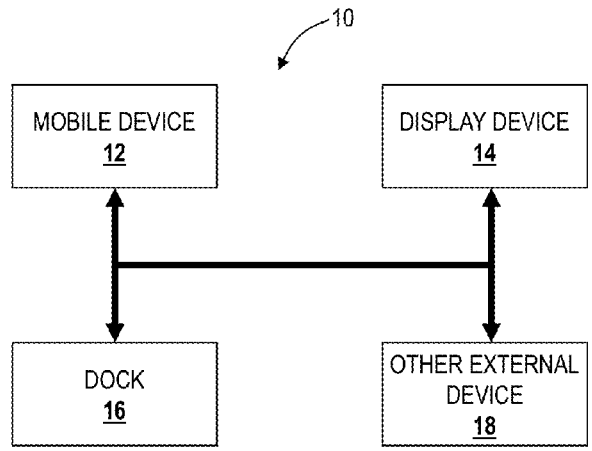
FIG. 1 illustrates a system configured to provide alternative control over a touch-based application being executed on a mobile device.

FIG. 1 illustrates a system 10 to provide alternative control via a mobile device 12. For example, system 10 may be configured to provide non-contact gesture control over the mobile device 12. This may enhance and/or enable use of the mobile device 12 as a source of visual information for presentation on an external display device 14. In some implementations, the system 10 may include one or more of the mobile device 12, the external display device 14, a dock 16, one or more other external devices 18, and/or other components.

The components of the system 10 may be directly or indirectly connected to one or more of the other system components in one or more different arrangements. For example, the mobile device 12 may be directly connected to the external display device 14. Alternatively, the mobile device 12 and/or the external device 18 may be directly connected to the dock 16, which may then directly connected to the external display device 14, creating an indirect connection between the external display device 14 and the mobile device 12 and/or the external device 18. These connections may be accomplished via wired and/or wireless communication media.

The mobile device 12 may be a wireless communication device that facilitates voice and/or data communications by a user. For example, the mobile device 12 may be configured to facilitate communication via one or more of CDMA, 3G, 4G, LTE, WiFi, WiMAX, and/or other radio frequency communications protocols. The mobile device 12 may be configured to facilitate communication of other types of information via a network. For example, the mobile device 12 may provide access to one or more of email communications, SMS messages, and/or other communications. The mobile device 12 may be configured to send and/or receive information over the Internet and/or other networks. Information communicated over a network may include web pages, information related to dedicated mobile applications (or "apps"), streaming content (e.g., still images, video, text, audio, and/or other content) and/or other information. By way of non-limiting example, the mobile device 12 may include one or more of a Smartphone, a personal digital assistant, a tablet, and/or other wireless, handheld, personal computing platforms. In some implementations, the mobile device 12 may be a device not typically considered to be "mobile", but implementing an operating system generally associated with mobile devices. Such devices may include, for example, a set top box (e.g., an Android set-top box, and/or other devices).

The external display device 14 may be configured to present visual information to users. By way of non-limiting example, the external display device 14 may include one or more of a television, a projector, a three dimensional display, a computer monitor, and/or other external display devices. When the mobile device 12 is coupled to the external device 14, the external display device 14 may present content received from the mobile device 12. Such content may include one or more of content received over a network by the mobile device 12 (e.g., streaming content), content generated by one or more applications being executed on the mobile device 12, content stored on the mobile device 12, and/or other content. The content may include audio information, visual information, and/or other information. Although it is not depicted in FIG. 1, the external display device 14 may be a smart television including one or more processors, an image capture device, and/or other components. The inclusion of one or more of such components in the external display device 14 may be implemented to provide some or all of the functionality attributed herein to similar components associated with the mobile device 12, and/or the dock 16.

The dock 16 may be configured to provide a coupling interface between the mobile device 12, the external display device 14, and/or the external device 18. The interface may facilitate communication of information between the mobile device 12, the external display device 14, and/or the external device 18. The dock 16 may be configured to provide power and/or charge the mobile device 12.

The external device 18 may include one or more other devices external to the mobile device 12, the external display device 14, and/or the dock 16. The external device 18 may generate information implemented by one or more of the mobile device 12, the external display device 14, and/or the dock 16, may enhance or enable operation of one or more of the mobile device 12, the external display device 14, and/or the dock 16, and/or may contribute to the operation of the system 10 in other ways. By way of non-limiting example, the external device 18 may include one or more of a web camera, a distance camera, other image capture devices, a light source, a microphone, an infrared sensor, and/or other components.

Figure 2:
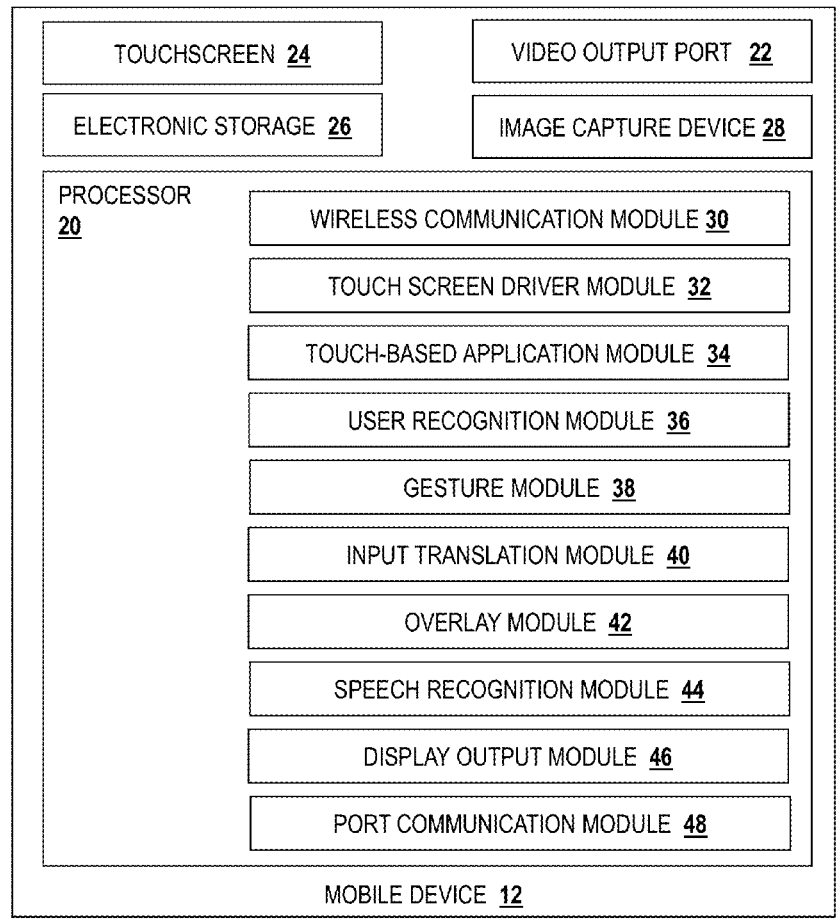
FIG. 2 illustrates a mobile device.

FIG. 2 illustrates an exemplary implementation of the mobile device 12. The mobile device 12 may include one or more of a processor 20, a video output port 22, a touchscreen 24, electronic storage 26, an image capture device 28, and/or other devices.

The processor 20 may execute one or more programmed sequences to accept digital input information, process the digital information according to programmed instructions, output digital results, and/or provide other information processing capabilities. Although FIG. 2 illustrates one processing unit, the functions of the processor 20 may be completed by one or more processing units with overlapping or unique functionality. In some implementations the processor 20 may be made up of one or more of a digital integrated circuit, an analog integrated circuit, an arithmetic logic unit (ALU), a control unit, BUS lines, cache memory, a transistor, a control signal, an instruction set, a register, or other components for processing digital information with the processor 20 or other information processing components located internal or external to the mobile device 12. The processing resources attributed to the processor may be provided virtually by a plurality of servers in a cloud configuration.

The modules executed by the processor 20 in the mobile device 12 may include one or more of a wireless communication module 30, a touchscreen driver module 32, a touch-based application module 34, a user recognition module 36, a gesture module 38, an input translation module 40, an overlay module 42, a speech recognition module 44, a display output module 46, a port connection module 48, and/or other modules. The modules 30, 32, 34, 36, 38, 40, 42, 44, 46, and/or 48 may be implemented in software; hardware; firmware; some combination of software, hardware, and/or firmware; and/or otherwise implemented. It should be appreciated that although the modules 30, 32, 34, 36, 38, 40, 42, 44, 46, and/or 48 are illustrated in FIG. 2 as being co-located within a single processing unit, in implementations in which the processor 20 includes multiple processing units, the modules 30, 32, 34, 36, 38, 40, 42, 44, 46, and/or 48 may be located remotely from the other modules. Further, the description of the functionality provided by the different modules 30, 32, 34, 36, 38, 40, 42, 44, 46, and/or 48 described below is for illustrative purposes, and is not intended to be limiting, as any of the modules 30, 32, 34, 36, 38, 40, 42, 44, 46, and/or 48 may provide more or less functionality than is described. For example, one or more of the modules 30, 32, 34, 36, 38, 40, 42, 44, 46, and/or 48 may be eliminated, and some or all of its functionality may be provided by other ones of the modules 30, 32, 34, 36, 38, 40, 42, 44, 46, and/or 48. As another example, the processor 20 may include one or more additional modules that may perform some or all of the functionality attributed below to one of the modules 30, 32, 34, 36, 38, 40, 42, 44, 46, and/or 48.

The wireless communication module 30 may facilitate wireless information transfer between the mobile device 12 and one or more other devices, networks, etc. The information transferred may include one or more of audio information, video information, and/or other information. The information transferred by the wireless communication module 30 may facilitate real time (or near real time) communications between the user of the mobile device 12 and the user(s) of one or more other devices. The wireless communication module 30 may operate on one or more networks comprising 4G, 3G, WiFi, LTE, and/or other networks. By way of a non-limiting example, the wireless communication module 30 may facilitate communication between the mobile device 12 and the dock 16, or the display device 14, other devices as described in FIG. 1, or other devices on a wireless network outside the system 10.

In some implementations, the touchscreen driver module 32 may be configured to serve as an interface between touchscreen 24 and one or more applications being executed by the processor 20 (e.g., the touch-based application module 34). This may include receiving input from the touchscreen 24 sensors and/or other sensors, devices, or components configured to generate input information from the touchscreen 24, and/or generating command output (e.g., based on the received input information) configured so a user may control an application or other program run on the mobile device 12. Command outputs may be generated by touchscreen the driver module 32 based on input to the mobile device 12 by the user. The touchscreen driver module 32 may be configured to generate command input to the touch-based application module 34 or another module that may be configured to accept input from touchscreen the driver module 32. The touchscreen driver module 32 output may be determined from the touchscreen 24 input signals via touchscreen sensors and/or other touch detection capability that may alter the monitored state of the touchscreen, and/or input signals from another device configured to generate input signals for the touchscreen driver module 32. User touch in one or more simultaneous locations, user gestures, user speech, or other user method of contact or non-contact control may be utilized by the user to change one or more states of the device monitored by one or more touchscreen systems as input information. By way of a non-limiting example, a user gesture may be used in a capacitive system to change the electrical charge at a single location on the touchscreen 24.

In some implementations, the touch-based application module 34 may generate visual information for display to a user. The visual information may be impacted by the inputs generated by the touchscreen driver module 32. For example, the visual information may be representative of, controlled by, determined responsive to, and/or impacted by the inputs in other ways. As such, a user may control, interact with, and/or otherwise manipulate the touch-based application module 34. The inputs to the touch-based application module 34 may include one or more of controls, user-selected settings and/or configuration options, information entry, and/or other inputs. By way of a non-limiting example, the touch-based application module 34 may include one or more of an electronic game, an email application, a web browser, a mobile device operating system, a mobile "app", and/or other applications run on the processor 20 of the mobile device 12.

The user recognition module 36 may be configured to analyze image information generated or captured by the image capture device 28 (and/or other image capture devices). The user recognition module 36 may be configured to perform one or more of recognizing one or more users' spatial position, one or more user body parts (and/or the position of the same), one or more unique user characteristics (e.g., fingerprint, voice, eye color, facial features, and/or other characteristics), or any other identifiable user characteristic user recognition module 36 is programmed to recognize. The output generated by the user recognition module 36 may be implemented as inputs to one or more of the application module 34, the gesture module 38, the overlay module 42, or other modules or devices configured to accept input from the user recognition module 36.

The outputs generated by the user recognition module 36 may indicate one or more user body position parameters, and/or other parameters of one or more users controlling the mobile device 12. The user body parameters indicated in the output of the user recognition module 36 may include one or more of a number of users, identifications of individual users, identified body parts of individual users, information related to pose, and/or other parameters. The body position parameters indicated by the output of the user recognition module 36 for a given user may include one or more of a profile/silhouette parameter, a parameter describing the relative position of two or more body parts (e.g., head, torso, legs, arms, hands, feet, and/or other body parts), a volume or area parameter, and/or other body position parameters. Other parameters indicated by the output of the user recognition module 36 may include one or more of a depth parameter related to the distance of the user from a real or virtual reference plane, a body pose parameter (e.g. parameterizing the pose of a player), a gesture parameter, a location parameter, an orientation parameter, a motion parameter, a rhythm parameter, a timing parameter, a size parameter, and/or other parameters.

In some implementations, the gesture module 38 may identify user gestures performed by users. Identification of a user gesture may be made based on analysis of the output of the user recognition module 36. A gesture may include a bodily motion, a body position, a sound, a body state, a position, and/or other gestures (and/or aspects thereof) made by the user. The gesture module 38 may identify gestures by monitoring the relative motion of key pointers in a three dimensional coordinate system or other method of tracking spatial movement or sound (e.g., based on the outputs of the user recognition module 36). The gesture module 38 may interpret user gestures via mathematical algorithms comprising three-dimensional model-based algorithms, skeletal-based algorithms, appearance-based algorithms or other algorithms configured to interpret user gestures. By way of a non-limiting example, a user may make a fist, drag the fist through space, and release the fist to select and drag through various screens of a mobile device. Other examples are also contemplated.

In some implementations, the input translation module 40 may be configured to spoof the output of the touchscreen driver module 32 based on the output of one or more of the user recognition module 36, the gesture module 38, and/or other modules. In some implementations, the input translation module 40 may be configured to receive information from the user recognition module 36, the gesture module 38, a module that generates input data without physically touching the touchscreen 24, and/or another component of the mobile device 12 or an external device that may accept contact or non-contact input (e.g. audio recording, picture, video). The input translation module 40 may be configured to accept data from one or more of image the capture device 28, the user recognition module 36, the gesture module 38, or another internal or external module or device that accepts user contact or non-contact input, and then spoof the outputs of the touchscreen driver module 32.

The input translation module 40 may be configured to output information to the touchscreen driver module 32, the application module 34, the overlay module 42 and/or other modules if the module has been configured to receive input from the input translation module 40.

By way of a non-limiting example, a user may gesture in view of the image capture device 28 in a way recognized by the gesture module 38. That gesture may be converted to input information for the input translation module 40 and spoofed so that in conjunction with the overlay module 42 and/or the touch-based application module 34 the user may view his gesture position relative to the displayed content of the touch-based application module 34.

It will be appreciated that the description of output from the gesture module 38 and/or the user recognition module 38 being usable by the touch-based application module 34 after being processed by the input translation module 40 is not intended to be limiting. In some implementations, the application module 34 may be configured to accept input information directly from one or more of the user recognition module 36, the gesture module 38, the input translation module 40, the overlay module 42, or other forms of input, without translation.

In some implementations, the overlay module 42 may be configured to generate overlay content that is to be presented to the user in conjunction with the displayed output of the touch-based application module 34. The overlay content may be superimposed over the displayed output of the touch-based application module 34 to provide guidance to the user controlling and/or interacting with the touch-based application module 34 via visual information captured by the image capture device 28 rather than through the touchscreen 24. In some implementations, the overlay module 42 may be configured to accept the outputs of one or more of the image capture device 28, the user recognition module 36, the gesture module 38, the input translation module 40, or other module or device configured to output information in a way recognized by the overlay module 42. The overlay module 42 may be configured to output information to one or more of the touch-based application module 34, the touchscreen 24, the display device 14 or another internal or external device configured to accept information from the overlay module 42. By way of non-limiting example, the overlay content may convey a user's gesture(s) relative to one or more applications ("apps") arranged on the touchscreen 24 of the mobile device 12 prior to non-contact selection, possibly via a second gesture, of that app for interaction.

Figure 3:
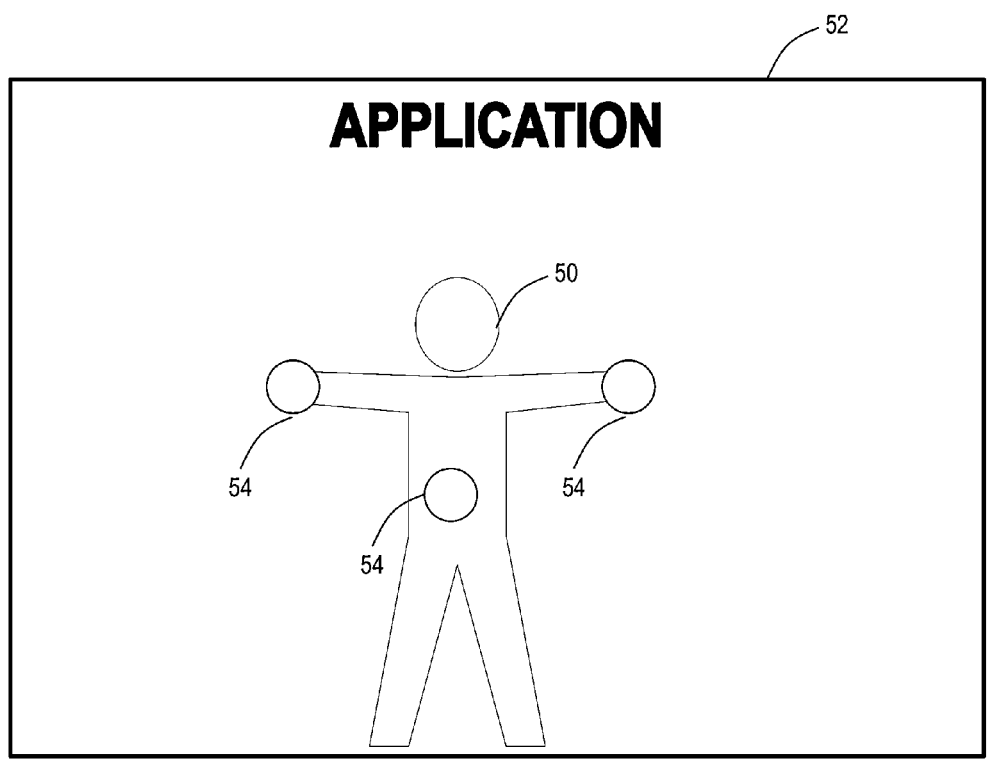
FIG. 3 illustrates an overlay superimposed over application output.

By way of illustration, FIG. 3 depicts a view 52, image information from a touch-based application module (e.g., similar to or the same as the touch-based application module 34 shown in FIG. 2 and described above). In the view 52, a user interface overlay 50 may be visible on the touchscreen 24. The view 52, with the overlay 50 may be presented to the user via an external display device (e.g., the external display device 14 shown in FIG. 1) or another external device (e.g., the other external device(s) 18 shown in FIG. 1). The overlay 50 includes overlay content, such as, for example, one or more of visual content, audio content, tactile content, and/or other content.

The overlay 50 may be configured to be superimposed over visual and/or audio information generated by the touch-based application module, wherein the user interface overlay is determined based on the image information representing the user. The overlay 50 may be configured to represent a current body position of the user. In some implementations, the overlay 50 may be configured to represent body positions of one or more individual user body parts. The overlay 50 may be configured to track and display user gestures (e.g. body position, sounds, movement, touch, or other contact or non-contact gestures) from one or more simultaneous users. The overlay 50 may be depicted as having a body position that corresponds to the body position of the user associated with the overlay representation (e.g., based on body position and/or body position parameters detected by the gesture module 38).

The overlay 50 may be configured to provide real time visual, audio, tactile, and/or other display information to a user via a display device based on user contact or non-contact gestures. The overlay 50 may be configured to track user gestures (e.g. body position, sounds, movement, touch, or other contact or non-contact gestures) relative to a view of a touch-based application displayed on a display device. The overlay 50 may be configured to allow a user to position a gesture relative to objects in a touch based application to affect intended change within the application displayed on a display device. In some implementations, a user's real time view of the overlay 50 relative to a touch based application displayed to the user on a display device may allow the user to interact with the display device in real time. A user may use the overlay 50 as user feedback relative for controlling a touch-based application via the user's gestures.

By way of a non-limiting example, FIG. 3 displays the overlay 50 as part of a game application displayed on the external display device 14 with a user's individual body parts 54 identified on the overlay 50. In the example, a user may gesture in a way that moves the overlay 50 to a desired position within the view 52 of the game application. The user may use the same and/or another gesture to select and move an object in the application.

As an example, if the game application in FIG. 3 is a chess game application, the user may control pieces of a chess game application by physically moving the user's body position so the overlay 50 is positioned over an individual chess piece, clapping the user's hands to "pick up" the piece within the game application, physically move the user's body through space so that the overlay 50 and the selected chess piece move across the game application chess board as viewed on the display device, and then clap the user's hands a second time to place the chess piece in the new desired location on the chessboard within the game application.

Returning to FIG. 2, the overlay module 42 may enable creation of customized overlays. Customization of an overlay may include customization of a size, shape, features (e.g., hair, facial features, and/or other features), clothing, props, and/or other aspects of the overlay that are customized. The overlay 50 may include an object, or set of objects. The overlay module 42 may manage associations between users that have previously established customized overlays on the mobile device 12. In some implementations, the characteristics of the overlay for a given application may depend on the given application. A customized user overlay may be created for separate types of applications (e.g., a game, an electronic social network site, an operating system). In some implementations, an overlay may be chosen automatically based on underlying parameters of the application (e.g., game genre, game type, game mechanic, control scheme or mechanism, and/or others). In some implementations, the application may designate one or more of the characteristics of the overlay to be applied. In some implementations, a user may select the overlay (or the overlay may be determined based on the application and pre-set user preferences).

The speech recognition module 44 may be configured to generate input control information so the mobile device 12 and/or applications run on the mobile device 12 may be controlled, at least in part, with voice or other audible commands. In some implementations, a user may dictate into a speech recognition engine. In some implementations transformation algorithms, synchronization algorithms, or other speech recognition module 44 programming may convert speech to text, and/or text to a command signal(s) and/or speech straight to command signal(s). The speech recognition module 44 algorithms may be statistically based or non-statistically based algorithms. The speech recognition module 44 algorithms may comprise one or more of acoustic modeling, language modeling, and/or other speech recognition algorithm modeling. In some implementations, the speech recognition module 44 may generate input information for the overlay module 42 or input information for the touch-based application module 34 directly.

The display output module 46 may output information generated by the processor 20. The display output module 46 may be configured to output video audio information, tactile information, and/or other output information for presentation to a user via the port connection module 48 to the touchscreen 24 of the mobile device 12, an external display device (e.g., the external display device 14 shown in FIG. 1) or another external device (e.g., the other external device(s) 18 shown in FIG. 1). The information may include, for example, the output of the touch-based application module 34, the overlay content generated by the overlay module 42, and/or other information and/or content.

The port connection module 48 may receive input from the display output module 46 and generate command output information via a signal or other method to the video output port 22, touchscreen 24, or other information output port or display. Port connection module 48 may function as an input or output transmission interface to transfer visual and or audio information.

The remaining components of the mobile device 12 shown in FIG. 2 include the video output port 22, the touchscreen 24, the electronic storage 26, and the image capture device 28.

The video output port 22 may be configured to output video audio information, tactile information, and/or other output information from the mobile device 12 for presentation to a user on an external display device (e.g., the external display device 14 shown in FIG. 1) or another external device (e.g., the other external device(s) 18 shown in FIG. 1). In some implementations, buttons or menus on the mobile device 12 (e.g., presented via the touchscreen 24, included on the mobile device 12 itself, and/or provided to the user in other ways) may allow a user to select output content and/or output format. By way of a non-limiting example, the mobile device 12 may be configured to facilitate video or audio information transfer via one or more of a radio frequency coaxial cable, composite video, SCART, component video, D-Terminal, VGA, sVideo, HDMI, MHL, a wired network connection, a wireless network connection, and/or other video communications formats. The video output port 22 may utilize one or more of a decoder, an encoder, a connecting port, a USB port, and/or other connecting hardware to output video and or audio information.

The touchscreen 24 may be configured to provide an interface to the mobile device 12 through which the user inputs information to and/or receives information from the mobile device 12. Through an electronic display capability of the touchscreen 24, graphics, text, and/or other visual content may be presented to the user. Superimposed over some and/or all of the electronic display of the touchscreen 24, the touchscreen 24 may include one or more sensors configured to generate output signals that indicate a position of one or more objects that are in contact with and/or proximate to the surface of the touchscreen 24. The sensor(s) of the touchscreen 24 may include one or more of a resistive, a capacitive, surface acoustic wave, or other sensors. In some implementations the touchscreen 24 may comprise one or more of a glass panel, a conductive layer, a resistive layer, a scratch resistant layer, a layer that stores electrical charge, a transducer, a reflector or other components.

In some implementations, the electronic storage 26 may comprise electronic storage media that electronically stores information. The electronically stored media of the electronic storage 26 may include one or both of system storage that is provided integrally (e.g., substantially non-removable) with the mobile device 12 and/or removable storage that is removably connectable to the mobile device 12 via, for example, a port (e.g., a USB port, a firewire port, etc.) or a drive (e.g., a disk drive, etc.). The electronic storage 26 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 26 may store software algorithms, information determined by other components of the mobile device 12, and/or other information that enables the mobile device 12 to function properly. The electronic storage 26 may include one or more separate components within the mobile device 12. The electronic storage 26 may include one or more components provided integrally with one or more other components of the mobile device 12 (e.g., the processor 20).

The image capture device 28 may be configured to capture visual information from an area around the mobile device 12. The image capture device 28 may generate one or more output signals that represent the captured visual information. The output signals may be generated by one or more photosensitive sensors and/or sensor arrays. Such sensors may include, without limitation, a CCD chip, a CMOS chip, and/or other photosensitive sensors. The electromagnetic radiation may be directed to the sensor(s) by one or more optical elements. Such elements may include one or more reflective elements, refractive elements, and/or other optical elements. The image capture device 28 may capture video, still images, and/or other visual information. The image capture device 28 may capture visual information at rates sufficient to allow a user to interact in real time with the mobile device 12. The image capture device 28 may include one or more of a web camera, a distance camera, a microscope, a stereoscope, a stereo camera, a depth aware camera, an RGB camera, an infrared camera, other cameras, or other visual information capturing devices. The image capture device 28 may include one or more light emitting elements. The image capture device 28 may include one or more depth sensors. The image capture device 28 may be internal or external to the mobile device 12. If external to the mobile device 12, the image capture device 28 may be connected to mobile device 12 through USB, Bluetooth, or other external connections that properly transmit visual information.

The image capture device 28 may be capable of capturing visual information from a plurality of locations on the mobile device 12. For example, to enable three-dimensional imaging, the image capture device 28 may be configured to capture stereoscopic images. As another example, the image capture device 28 may be configured to capture images on from both the front and the back of the mobile device 12 (e.g., to enable videoconferencing). In such implementations, the visual information may be captured by a single imaging sensor and/or separate imaging sensors included in the image capture device 28.

Figure 4:
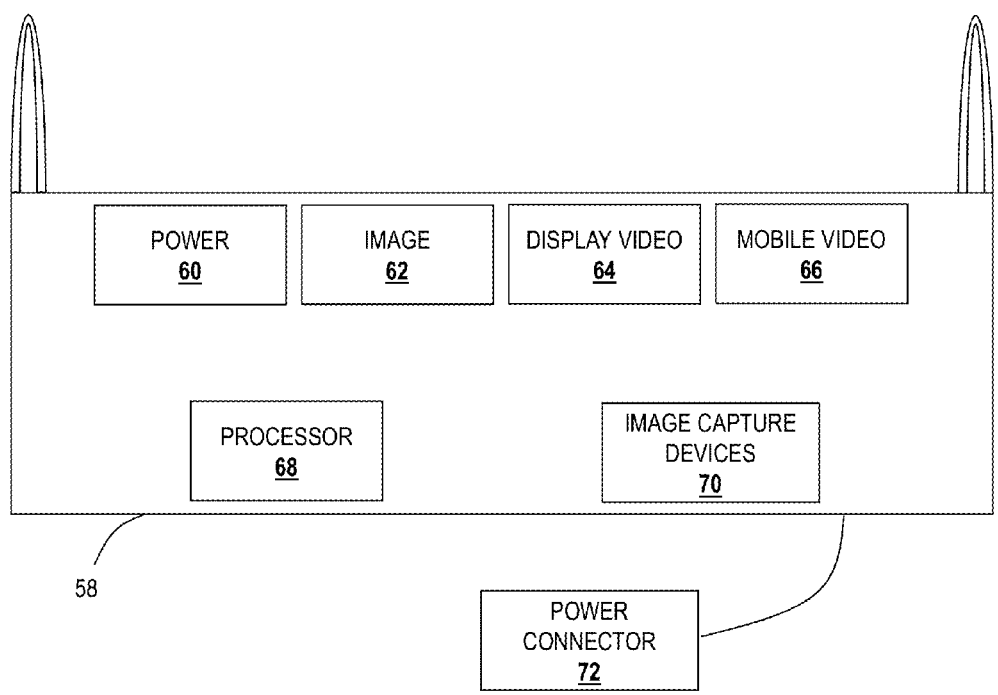
FIG. 4 illustrates a dock for a mobile device.

FIG. 4 illustrates one or more implementations of the mobile dock 16. In some implementations, the dock 16 may be configured to connect a mobile device (e.g. the mobile device 12) with an external display device (e.g. the external display device 14). As can be seen in FIG. 4, the dock 16 may include one or more of a device seat 56, a housing 58, a power provision port 60, an image information port 62, a display device video port 64, a mobile device video port 66, a processor 68, an image capture device 70, a power supply connector 72, and/or other devices.

The device seat 56 may be configured to mechanically hold and support a mobile device or other devices in place on a docking station. The housing 58 may be configured to contain components of the dock 16 and/or other components as a unit. The image capture device 70 may be configured to capture image information representing a user or other image information. The image information port 62 may be configured to couple the image capture device 70 to a mobile device (e.g. the mobile device 12) to facilitate the transfer of image information from the image capture device 70 to a mobile device. The mobile device video port 66 and/or the display device video port 64 may be configured to couple a mobile device with an external display device to facilitate the communication of visual information from a mobile device to an external display device for display on an external display device.

The processor 68 may execute one or more programmed sequences to accept digital input information, process the digital information according to programmed instructions, output digital results, and/or provide other information processing capabilities. Although FIG. 4 illustrates one processing unit, the functions of the processor 68 may be completed by one or more processing units with overlapping or unique functionality. In some implementations, the processor 68 may be made up of one or more of a digital integrated circuit, an analog integrated circuit, an arithmetic logic unit (ALU), a control unit, BUS lines, cache memory, a transistor, a control signal, an instruction set, a register, or other components for processing digital information with the processor 68 or other information processing components located internal or external to the dock 16. The processing resources attributed to the processor may be provided virtually by a plurality of servers in a cloud configuration. The processor 68 may be configured to execute one or more of the modules shown in FIG. 2.

The power supply connector 72 may be configured to removably connect with one or more external power supplies. The power provision port 60 and/or the power supply connector 72 may be configured to couple a mobile device to one or more external power supplies to facilitate the provision of power from one or more external power supplies to the mobile device and/or other devices.

The dock 16 image information may comprise one or more of video image, still images, intensity images, depth images, or other image information.

Figure 5:
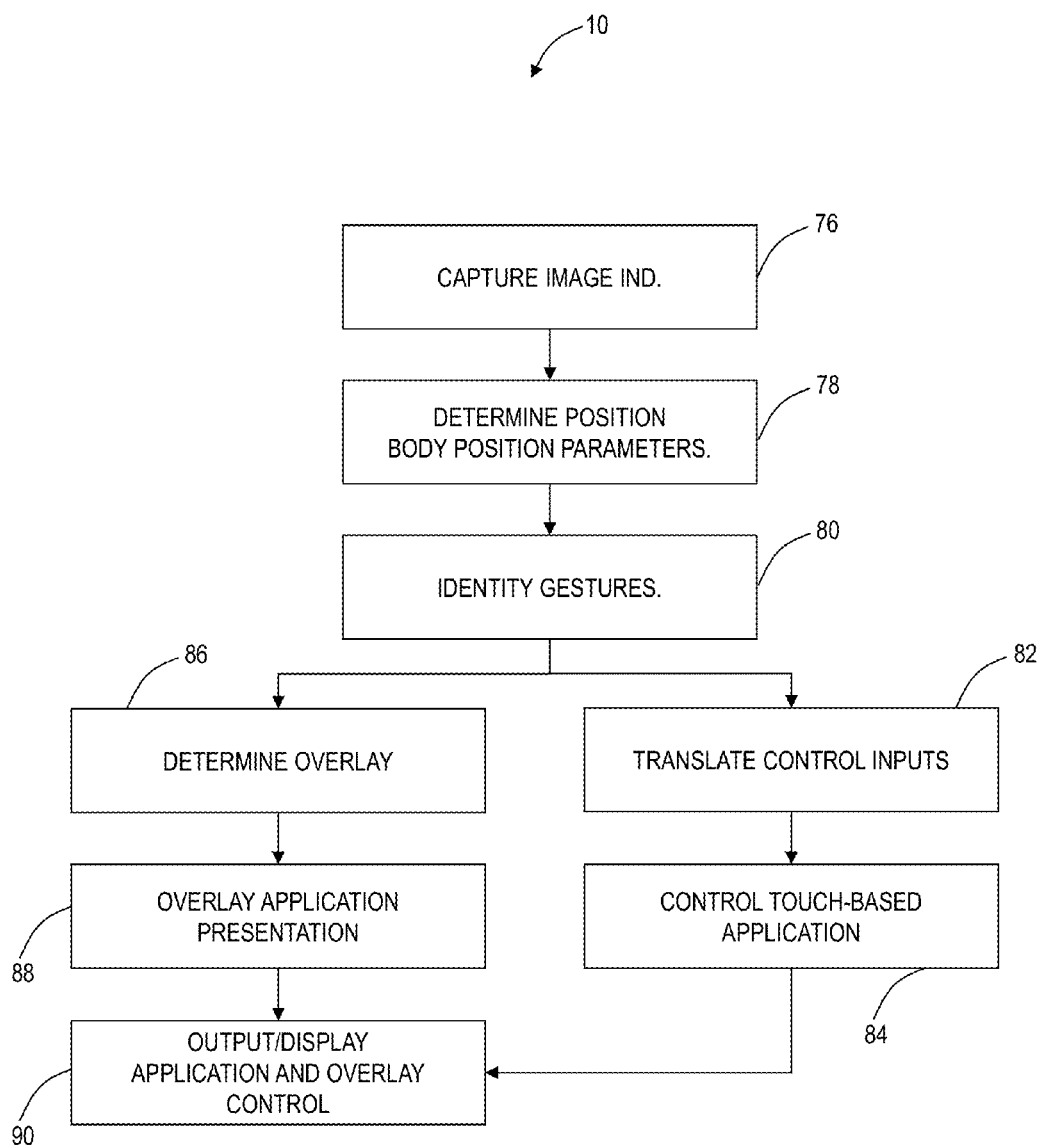
FIG. 5 illustrates a method of providing alternative control over a touch-based application.

FIG. 5 illustrates a method 74 of controlling a touch-based application being executed on a mobile device with computer vision. The operations of the method 74 presented herein are intended to be illustrative. In some embodiments, the method 74 may be accomplished with one or more additional operations not described, and/or without one or more of the operations discussed. Additionally, the order in which the operations of the method 74 are illustrated in FIG. 5 and described below is not intended to be limiting.

In some embodiments, the method 74 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 74 in response to instructions stored electronically on an electronic storage medium. The one or more processing devices may include one or more devices configured through hardware, firmware, and/or software to be specifically designed for execution of one or more of the operations of the method 74.

At an operation 76, image information may be captured. The image information may include one or more of RGB information, depth information, and/or other information associated with images. The image information may include video information and/or still image information. The image information may be generated by an image capture device associated with the mobile device (e.g., the image capture device 28 shown in FIG. 2 and described above), an image capture device associated with a dock for the mobile device (e.g., the image capture device 70 shown in FIG. 4 and described above), an image capture device associated with a display device (e.g., the display device 16 shown in FIG. 1 and described above), a separate image capture device (e.g., a webcam, a depth camera, and/or other image capture devices), and/or other image capture devices.

At an operation 78, information related to the position and/or the body position of the user may be determined. Such information may be determined from the image information captured at the operation 76. Such information may include one or more parameters related to the position and/or the body position of the user. In some implementations, the operation 78 may be performed by a user recognition module the same as or similar to the user recognition module 36 (shown in FIG. 2 and described herein).

At an operation 80, one or more gestures performed by the user may be identified. The identification of the gestures may be performed based on the image information captured at the operation 76, the information related to position and/or body position captured at the operation 78, and/or other information. In some implementations, the operation 80 may be performed by as gesture module the same as or similar to the gesture module 38 (shown in FIG. 2 and described herein).

At an operation 82, the position, body position, and/or gestures of the user may be translated into control inputs to the touch-based application. This translation may spoof control inputs typically generated for the touch-based application by one or more touch-based sensors associated with a touchscreen, a touchpad, and/or other touch-based control interfaces. The control inputs may control operation of the touch-based application. In some implementations, the operation 82 may be performed by an input translation module the same as or similar to the input translation module 40 (shown in FIG. 2 and described herein).

At an operation 84, the touch-based application may be controlled by the control inputs generated at the operation 82. In some implementations, the operation 84 may be performed by a touch-based application module the same as or similar to the touch-based application module 34 (shown in FIG. 2 and described herein).

At an operation 86, overlay content associated with an overlay to be presented with the touch-based application may be determined. The overlay content may include visual information, audio information, tactile information, and/or other information configured to provide the user with feedback related to position, body position, gestures, and/or other control information. The operation 86 may include determining one or more characteristics of the overlay content that are independent from a current position, body position, and/or gesture. Such characteristics may include, for example, a size, a shape, a relative volume, a shade or color, and/or other characteristics. Such characteristics may be determined based on a user selection and/or user configured settings, an application type or genre, and/or based on other information. In some implementations, the operation 86 may be performed by an overlay module the same as or similar to the overlay module 42 (shown in FIG. 2 and described herein).

At an operation 88, the overlay content determined at the operation 86 may be superimposed on output from the touch-based application. In some implementations, operation 86 may be performed by an output module the same as or similar to the output module 48 (shown in FIG. 2 and described herein).

At an operation 90, the output from the touch-based application and the overlay content may be presented to the user. This may include outputting the output from the application and the overlay content to a display device and/or actually displaying the output from the application and the overlay content. In some implementations, the operation 90 may be performed by an output module and/or a display device the same as or similar to the output module 48 (shown in FIG. 2 and described herein) and/or the display device 16 (shown in FIG. 1 and described herein).

Figure 6:
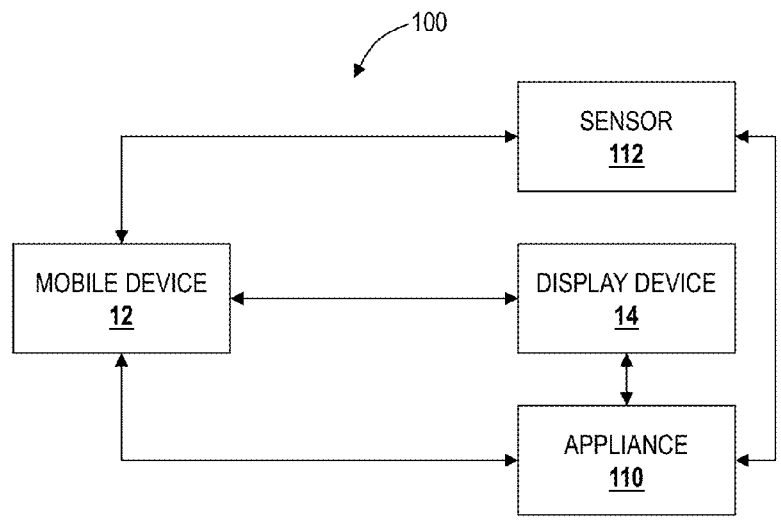
FIG. 6 illustrates a block diagram of an exemplary system for alternative control of a mobile device.
Figure 7:
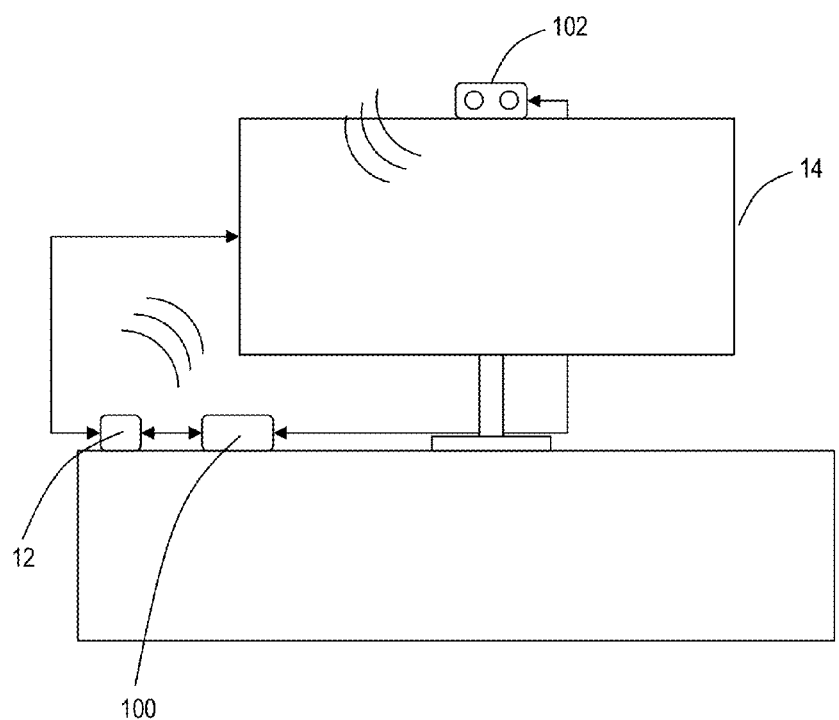
FIG. 7 illustrates a front perspective view of an exemplary system for alternative control of a mobile device.

FIG. 6 is a block diagram and FIG. 7 is a front perspective view of an exemplary system 100 for alternative control of a mobile device 12. The system 100 can include similar components and/or functionality as the system 10. The system 100 includes the mobile device 12, the display device 14, an appliance 110, and a sensor 112. The mobile device 12 can include, without limitation, a smart phone, a tablet, a net book, an ultra-book, a laptop, etc. that is configured for touch-based control. The mobile device 12 can operate, without limitation, iOS from Apple, Android or Chrome from Google, Windows from Microsoft, or the like. The display device 14 can be an external display communicatively coupled to the mobile device 12 for displaying apps from the mobile device 12. For example, the display device 14 can include, without limitation, a television, a projector, a monitor, or the like.

The appliance 110 can be a computer or the like configured to interface between the mobile device 14 and the sensor 112 for enabling alternative control of the touch-based, mobile device 14. The sensor 112 can include a depth camera configured to detect motion of a user for gesture control in lieu of touch-based control of the mobile device 14. For example, the sensor 112 can be an off-the-shelf component such as an ASUS Xtion or Microsoft Kinect. The sensor 112 can use a USB or Bluetooth connection to the appliance 110. In the context of system development, the sensor 112 is expected to be the most expensive hardware component. Note, users typically already have the mobile device 12 and the display device 14 and possibly the sensor 112 (e.g., for a gaming platform such as the Xbox from Microsoft). If the sensor 112 is already present, the sensor 112 can be connected to the appliance 110 via a Y-cable or through a USB hub or through a shared Bluetooth connection.

The appliance 110 and/or the mobile device 12 is configured to provide various functionality associated with the modules 30, 32, 34, 36, 38, 40, 42, 44, 46, and/or 48. That is, the functionality described in the system 10 can be performed in the various components of the system 100. For example, the appliance 110 can be a computer vision processor, and the screen recognition can be performed via the mobile device 12. The appliance 110 is configured, generally, to translate gestures from the sensor 112 to touch-based inputs to the mobile device 12 for control thereof. The appliance 110 is a mini-computer and can be based on an ARM processor operating Linux such as the Raspberry Pi, Beagle Bone Black, etc. Alternatively, the appliance 110 can be an ADAPT ES1 device from LS Research, a Snapdragon S4 mobile device originally designed for DARPA. The ADAPT ES1 is similar to a Samsung Galaxy S3 but lacks a display and touchscreen. The ADAPT ES1 is powerful enough to act as both (a) an accessory device to another phone or tablet, i.e. the mobile device 12, and (b) a set top box entertainment device capable of playing games like Need for Speed or streaming Netflix or Amazon Instant Video to the display device 14. For example, the appliance 110 can both be an interface to the mobile device 12 for translating gestures to control apps on the mobile device 12 as well as a set top box for providing content to the display device 14 such as via Over-the-Top (OTT) content providers. Advantageously, the system 100 contemplates using the TV, i.e. the display device 14, for display of content from the mobile device 12 and in-air gestures used to control the mobile device 12.

The system 100 can include various options for connectivity between the components 12, 14, 100, 102. First, the mobile device 12 can be directly connected to the display device 14 for providing video thereto. Alternatively, the mobile device 12 can be connected to the appliance 110, and the appliance 110 can be connected to the display device 14 for providing video thereto from the mobile device 12. The sensor 112 can be connected either to the mobile device 12 directly or through the appliance 110. All of the connections can be either wired or wireless as is known in the art.

The system 100 enhances TV-connected mobile gaming by enabling a wide range of individual and group gestures to seamlessly work with the mobile device 12. Player movements can include (a) in-air hand gestures, (b) leaning, (c) discrete and recognizable gestures such as jumping, crouching, arm raising and (d) non-discrete general movement by a crowd of varying size versus stillness, and the like. This variety of motion-based control is map-able to a massive library of existing mobile games on a game-by-game and even screen-by-screen basis without modifying any original application source code. This makes operations by virtually touching and tilting the mobile device 12. For example, the user extends a hand towards the display device 14 which has the sensor 112 on top of it or near it and a hand cursor appears on the display device 14. General touchscreen interaction is replaced by moving the cursor with an open hand and "touching down" on the touchscreen by closing the outstretched hand. This enables general touch replacement using gestures. Likewise, the user may lean left and right to virtually tilt the device, enabling general tilt replacement.

The system 100 can also include Gesture Control Services which enhance usability by recognizing the context of an app. This includes an innovative software layer which can be used to make it more fun to play games like Angry Birds using gestures than with general cursor movement and touch replacement. The system 100 offers an intelligent vision-based control system that is deeply integrated into the mobile device 12 as a software patch or app that adapts to the changing needs of app control. By intelligence, the system can recognize the currently visible app and in-app context via machine-learned models of application usage. To be more specific, the system 100 can include two concrete examples of switching and blending.

The system 100 includes automatic switching between computer vision algorithms. For example, in racing games such as Need for Speed, the system 100 can map an aggregate lean angle estimate to the game's steering function, which is natural and fun. But there are moments of interaction, such as menu screen navigation and level selection, which may be better suited for hand tracking-based control. Upon level completion, the player is prompted with a menu. The system 100 can recognize that the user is prompted with a menu and instantly switch from leaning to hand tracking for menu control. If the player makes a selection to begin a new level, the system 100 switches hand tracking off and leaning back on. Or if the player quits the game to launch another app, the system 100 keeps hand tracking engaged for the purpose of selecting an app from the mobile device 12. The system 100 is able to do this by monitoring multiple sources of information and comparing them to previously collected training data in real-time.

The system 100 includes blending vision-based controllers. For example, Temple Run is an example of a game that employs both the accelerometer and touchscreen in a clever fashion. The player runs through an Indiana Jones-like environment to collect coins while avoiding obstacles and falling off a track. Swiping up makes the player jump to avoid gaps or enemies, swiping down is used for crouching under tree branches and left-right swipes turn the player to avoid running off the track at a T junction. While swiping, the player may tilt the smartphone or tablet to slide from side to side across the track to collect coins. Upon recognizing that Temple Run has been launched, the system 100 engages leaning and discrete gesture recognition capabilities; leaning is mapped to sliding from side to side, pointing to the left and right results in turning 90 degrees to stay on track and jumping and crouching in front of the display device 14 is mapped to swipes up and down on the touchscreen. Those of ordinary skill in the art will recognize these mappings can be different for a variety of different apps on the mobile device 12.

Advantageously, the system 100 includes deep integration with the operating system of the mobile device 12, e.g. Android. In this manner, the system 100 seeks to avoid requiring the app developer to provide the translation mapping between touch-based and gesture-based control. The system 100 is tailored for both (a) carriers and OEMs wishing to bring a universal gesture control solution to their customers and (b) software developers interested in making first party gesture-based apps. One aspect of the system 100 is to avoid solely focusing on mapping hand tracking to general touchscreen control. The system 100 also includes leaning gestures or the like for accelerometer control as well. Games like Need for Speed and Temple Run are unlikely to be fun to play with hand tracking alone.

The system 100 leverages the vast library of apps for the mobile device 12 and the ability to couple the mobile device 12 to the display device 14 and the sensor 102 for gesture control. In this manner, the system 100 can bring the mobile device 12 into the living room. For example, OTT content providers are proliferating, and the system 100 can be used to watch and control content on the display device 14 in addition to playing all of the touch-based games.

Figure 8:
FIG. 8 illustrates screenshots of the Angry Birds app to illustrate a Gesture Assist function.
Figure 8:
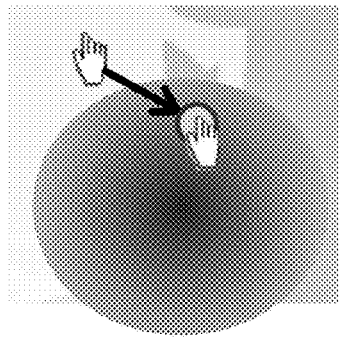
Figure 8:
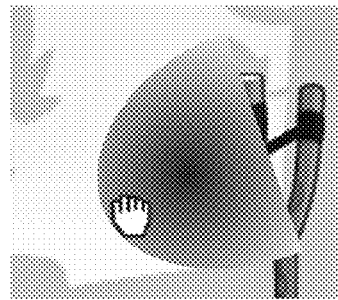

The system 100 can apply computer vision in two ways—vision for gesture tracking and vision on screenshots in the cloud. In the vision for gesture tracking, the sensor 102 is configured to track and recognize user gestures in real-time. This can include hand gestures, leaning, running in place, movement, etc. In the vision on screenshots in the cloud, the system 100 includes a user behavior module learned offline in the cloud to support a Gesture Assist function. For example, the appliance 110 can be connected to one or more servers in the cloud to report usage, etc. FIG. 8 illustrates screenshots of the Angry Birds app to illustrate the Gesture Assist function. As an input, recordings of touches and screenshots serve as training data to the Gesture Assist function. An output of the Gesture Assist function includes a user model to predict the most likely interaction per screenshot. For example, a "snap to" where a cursor enters a region of interest and is snapped to an anchor or a "drag region" which translate large hand movements into bounded, fine grained cursor movements when dragging objects.

The Gesture Assist function can provide assistance in various increments to users, such as easy, medium, and hard. The Gesture Assist function can provide game play assistance such as for younger players, e.g. toddlers, and the like with the easy setting. The medium setting can provide some assistance to bound user movement to game play whereas the hard setting can provide little to no assistance. The Gesture Assist function is an Intelligent Control System designed to leverage both kinds of computer vision (on Hands, Screenshots) and can use a Bayesian Control System to compute a most likely target given current depth and screenshot and state at previous frame.

Figure 9:
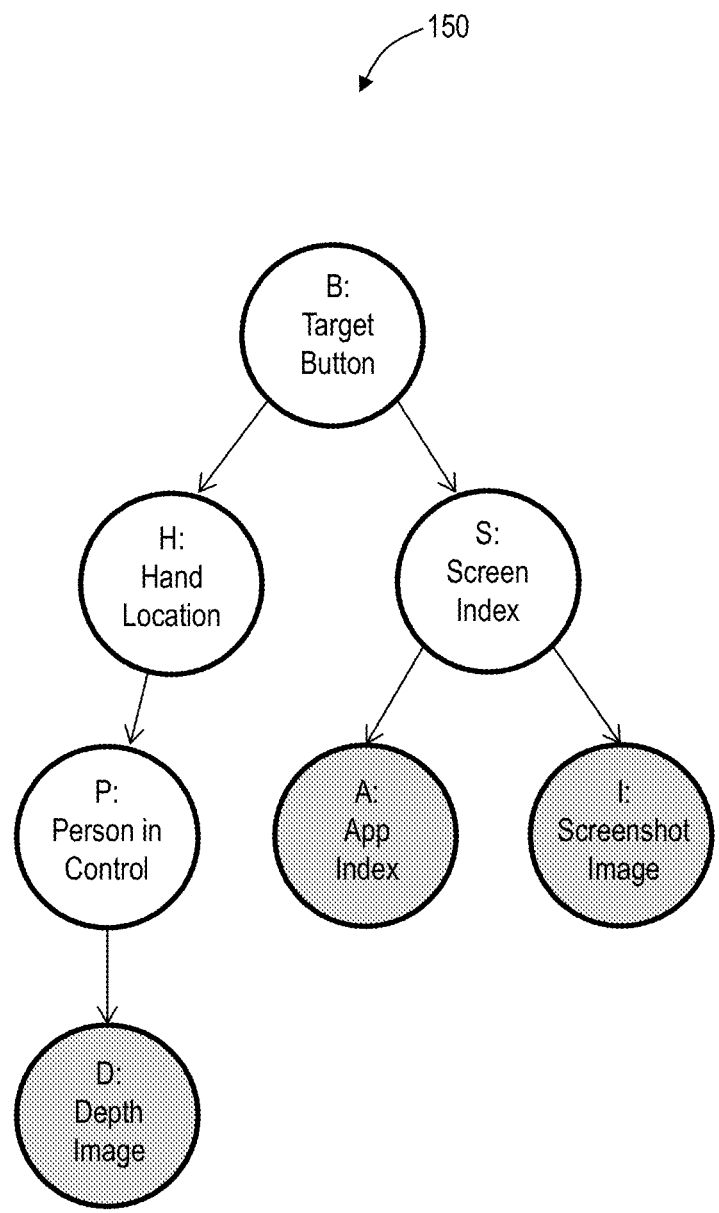
FIG. 9 illustrates a graphical model for a control system in the Gesture Assist function.

FIG. 9 illustrates a graphical model 150 for a control system in the Gesture Assist function. The graphical model 150 includes the following random variables:

| Random Variable | Description |
| --- | --- |
| B: Target Button (hidden state) | Current cursor location on TV, lined up with the intended button to press. Cursor moves as hand moves |
| H: Hand Location (hidden state) | Current hand location in face-centered coordinate system |
| S: Screen Index (hidden state) | Index of screenshot (e.g. menu screen for Angry Birds) |
| P: Person in Control (hidden state) | Region of interest (box) in depth image indicating who is in control, which defines face-centered coordinate system |
| A: App Index (observed state) | Number that identifies the running application (e.g. APK id) |
| I: Screenshot Image (observed state) | Current screenshot (color image) |
| D: Depth Image (observed state) | Current depth image (grayscale) |

The gray circles, A, I, and D, in FIG. 9, show pieces of information observable at runtime when someone is using the mobile device 12 with the system 100. The white circles are unobserved variables. These are basically the outputs of variable computer vision modules, such as described in FIG. 2. For example, "S: Screen Index" is a screenshot recognition module. A screenshot may be recognized by applying image recognition techniques, such as "Scalable Recognition Using Vocabulary Trees" to an input that is an actual screenshot of a game running on the mobile device 12. But it can be expensive to take screenshots and process them with image recognition techniques in real-time. To address the computational expense, the system 100 uses a new technique for recognizing the screen of an app by inspecting an OpenGL command stream, or set of commands that were used to tell the graphics hardware (GPU) to draw the particular screen in a game. For example, the system 100 can count the number of times it sees a particular command. It is a frequency table of OpenGL commands, otherwise known as a term frequency feature. This is how the system 100 can estimate button locations for a given screen. The term frequency feature is used to recognize a screen in a game. Following recognition, previously recorded interactions (e.g. touches) are registered to the screen recognized at runtime. This registration or alignment of touch points may be used to infer button locations by clustering the observed touch locations. This assumes enough training data has been captured to record the touches of all touchable regions.

Figure 10:
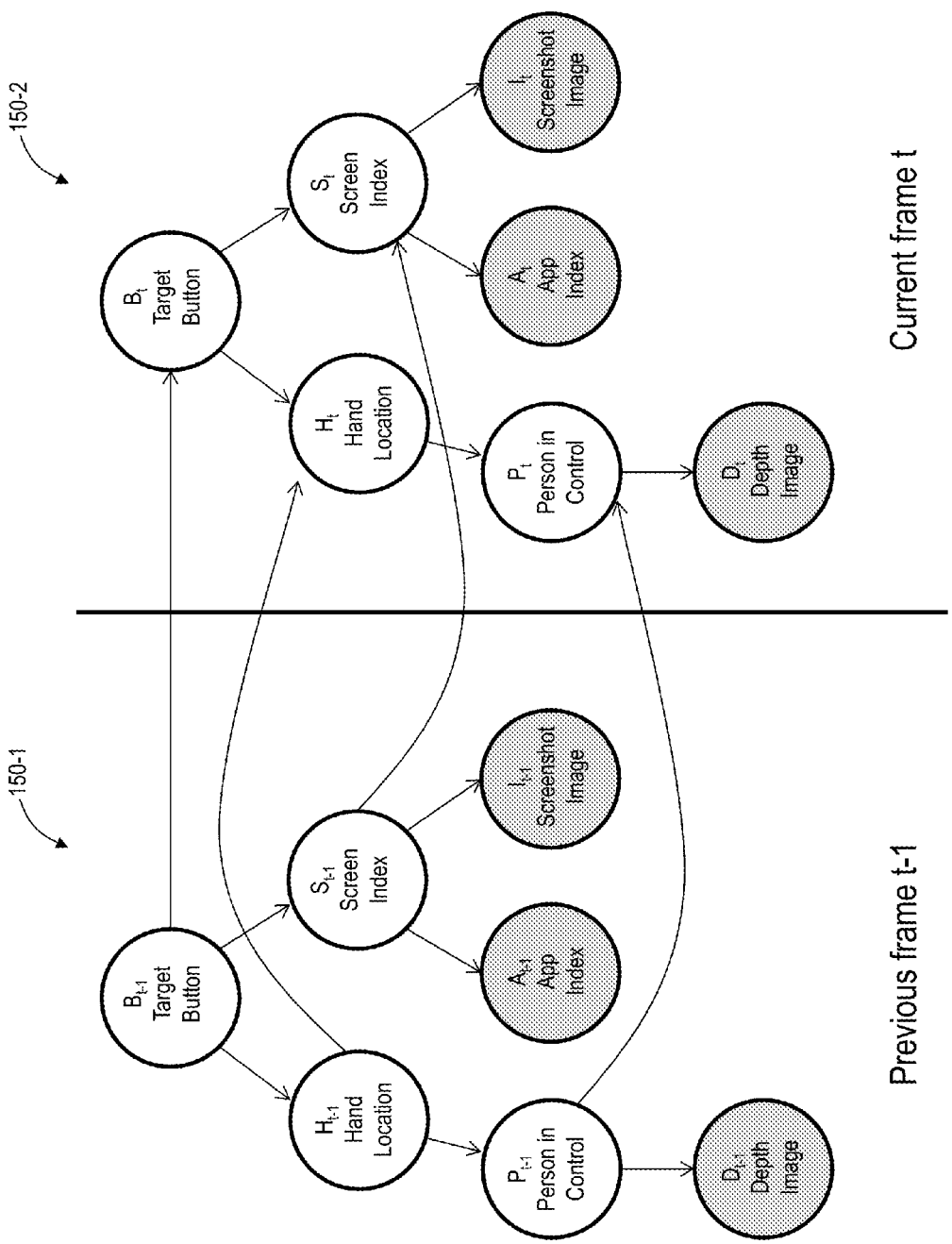
FIG. 10 illustrates a hidden Markov model for modeling interactions over time between a previous frame and a current frame.

FIG. 10 is a hidden Markov model for modeling interactions over time between a previous frame with a graphical model 150-1 and a current frame with a graphical model 150-2. The goal is to compute most likely target button given observed data (gray shaded—variables D, A, and I) and state at previous frame. An on-screen cursor location at frame t given by: Cursor location at previous frame (t-1), Hand location at previous frame, Screen index at previous frame, Current depth image, Current app index, and Current screenshot. The task is to find the parameters of the target button which maximize the target button probability conditioned on current observations and previous state—argmax $P(B_t|B_{t-1}, H_{t-1}, S_{t-1}, D_t, A_t, I_t)$.

The following describe exemplary solutions to sub-problems of the control inference problem. For the hand location, H, P(H|D,P) can be based on a novel hand pose recognition algorithm using random fern for shape regression on depth. The input can be depth image and the output can be face (x,y), hand (x,y), hand pose (open or closed). For person in control, P, P(P|D) can be based on a novel face detector using CoBE on depth with the input being depth image and the output being face boxes. For screen index, S, P(S|A,I) can be based on a screenshot recognition using a per-app vocabulary tree such as described in D. Nister and H. Stewenius, "Scalable Recognition with a Vocabulary Tree," Conference on Computer Vision and Pattern Recognition, 2006. For the button target, B, P(B|H,S) can be based on a button recognition technique using a novel technique inspired by panorama annotation transfer technique such as described in Özuysal et. al., "Fast Keypoint Recognition using Random Ferns", PAMI 2010.

From this, the Gesture Assist function can compute argmax $P(B_t|\text{all observations,HMM params})$. The Estimated screen index enables alignment of training data to current screen. The training data contains recorded touch points per screen. The transition probability table is learned from touch sequences in training data. The Gesture Assist function can use Viterbi algorithm to compute optimal button location. The hand location's influence on selected button can be governed by Gesture Assist level, e.g. hard level: human is in full control to easy level: computer is mostly in control.

Figure 11:
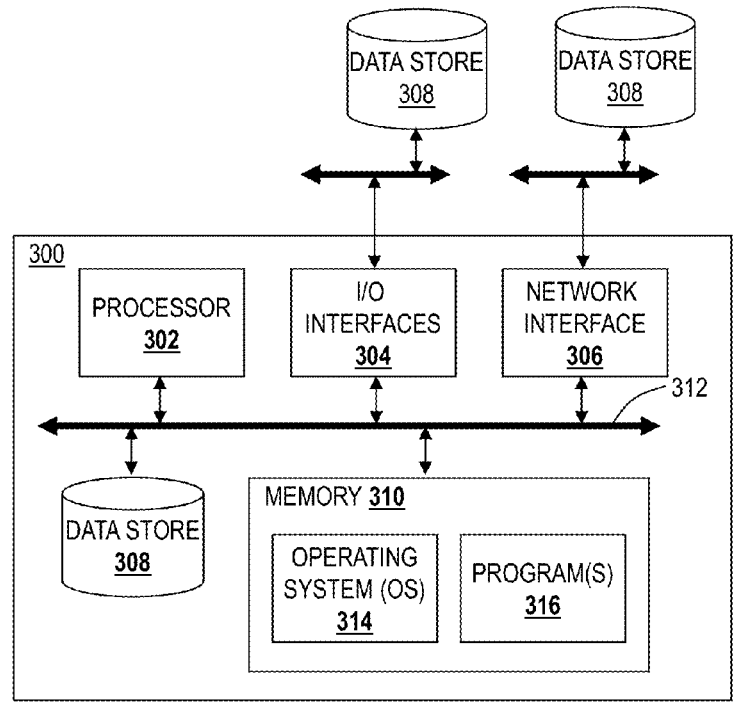
FIG. 11 illustrates a block diagram of a server which may be used in the systems and methods described herein.

FIG. 11 is a block diagram of an exemplary server 300. The server 300 may form the basis for the appliance 110. The server 300 may be a digital computer that, in terms of hardware architecture, generally includes a processor 302, input/output (I/O) interfaces 304, a network interface 306, a data store 308, and memory 310. It should be appreciated by those of ordinary skill in the art that FIG. 11 depicts the server 300 in an oversimplified manner, and a practical embodiment may include additional components and suitably configured processing logic to support known or conventional operating features that are not described in detail herein. The components (302, 304, 306, 308, and 310) are communicatively coupled via a local interface 312. The local interface 312 may be, for example but not limited to, one or more buses or other wired or wireless connections, as is known in the art. The local interface 312 may have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 may be any custom made or commercially available processor, a central processing unit (CPU), an auxiliary processor among several processors associated with the server 300, a semiconductor-based microprocessor (in the form of a microchip or chip set), or generally any device for executing software instructions. When the server 300 is in operation, the processor 302 is configured to execute software stored within the memory 310, to communicate data to and from the memory 310, and to generally control operations of the server 300 pursuant to the software instructions. The I/O interfaces 304 may be used to receive user input from and/or for providing system output to one or more devices or components. User input may be provided via, for example, a keyboard, touch pad, and/or a mouse. System output may be provided via a display device and a printer (not shown). I/O interfaces 304 may include, for example, a serial port, a parallel port, a small computer system interface (SCSI), a serial ATA (SATA), a fibre channel, Infiniband, iSCSI, a PCI Express interface (PCI-x), an infrared (IR) interface, a radio frequency (RF) interface, and/or a universal serial bus (USB) interface.

The network interface 306 may be used to enable the server 300 to communicate on a network, such as the Internet, a wide area network (WAN), a local area network (LAN), and the like, etc. The network interface 306 may include, for example, an Ethernet card or adapter (e.g., 10 BaseT, Fast Ethernet, Gigabit Ethernet, 10 GbE) or a wireless local area network (WLAN) card or adapter (e.g., 802.11a/b/g/n). The network interface 306 may include address, control, and/or data connections to enable appropriate communications on the network. A data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media. In one example, the data store 1208 may be located internal to the server 300 such as, for example, an internal hard drive connected to the local interface 312 in the server 300. Additionally in another embodiment, the data store 308 may be located external to the server 300 such as, for example, an external hard drive connected to the I/O interfaces 304 (e.g., SCSI or USB connection). In a further embodiment, the data store 308 may be connected to the server 300 through a network, such as, for example, a network attached file server.

The memory 310 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 may include one or more software programs, each of which includes an ordered listing of executable instructions for implementing logical functions. The software in the memory 310 includes a suitable operating system (O/S) 314 and one or more programs 316. The operating system 314 essentially controls the execution of other computer programs, such as the one or more programs 316, and provides scheduling, input-output control, file and data management, memory management, and communication control and related services. The one or more programs 316 may be configured to implement the various processes, algorithms, methods, techniques, etc. described herein.

Figure 12:
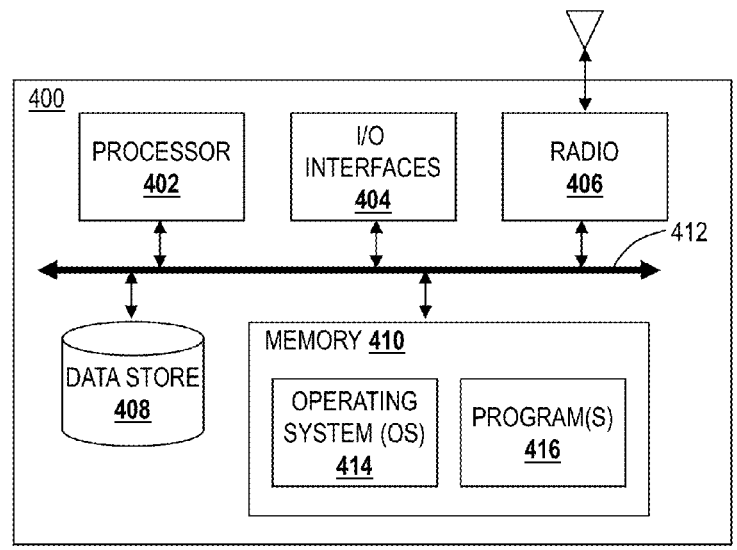
FIG. 12 illustrates a block diagram of a mobile device which may be used in the systems and methods described herein.

FIG. 12 is a block diagram of another exemplary implementation of a mobile device 400 which can be used for the mobile device 12. The mobile device 400 can be a digital device that, in terms of hardware architecture, generally includes a processor 402, input/output (I/O) interfaces 404, a radio 406, a data store 408, and memory 410. It should be appreciated by those of ordinary skill in the art that FIG. 12 depicts the mobile device 410 in an oversimplified manner, and a practical embodiment may include additional components and suitably configured processing logic to support known or conventional operating features that are not described in detail herein. The components (402, 404, 406, 408, and 402) are communicatively coupled via a local interface 412. The local interface 412 can be, for example but not limited to, one or more buses or other wired or wireless connections, as is known in the art. The local interface 412 can have additional elements, which are omitted for simplicity, such as controllers, buffers (caches), drivers, repeaters, and receivers, among many others, to enable communications. Further, the local interface 412 may include address, control, and/or data connections to enable appropriate communications among the aforementioned components.

The processor 402 is a hardware device for executing software instructions. The processor 402 can be any custom made or commercially available processor, a central processing unit (CPU), an auxiliary processor among several processors associated with the mobile device 410, a semiconductor-based microprocessor (in the form of a microchip or chip set), or generally any device for executing software instructions. When the mobile device 410 is in operation, the processor 402 is configured to execute software stored within the memory 410, to communicate data to and from the memory 410, and to generally control operations of the mobile device 410 pursuant to the software instructions. In an exemplary embodiment, the processor 402 may include a mobile optimized processor such as optimized for power consumption and mobile applications. The I/O interfaces 404 can be used to receive user input from and/or for providing system output. User input can be provided via, for example, a keypad, a touch screen, a scroll ball, a scroll bar, buttons, bar code scanner, and the like. System output can be provided via a display device such as a liquid crystal display (LCD), touch screen, and the like. The I/O interfaces 404 can also include, for example, a serial port, a parallel port, a small computer system interface (SCSI), an infrared (IR) interface, a radio frequency (RF) interface, a universal serial bus (USB) interface, and the like. The I/O interfaces 404 can include a graphical user interface (GUI) that enables a user to interact with the mobile device 410. Additionally, the I/O interfaces 404 may further include an imaging device, i.e. camera, video camera, etc.

The radio 406 enables wireless communication to an external access device or network. Any number of suitable wireless data communication protocols, techniques, or methodologies can be supported by the radio 406, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); wireless home network communication protocols; paging network protocols; magnetic induction; satellite data communication protocols; wireless hospital or health care facility network protocols such as those operating in the WMTS bands; GPRS; proprietary wireless data communication protocols such as variants of Wireless USB; and any other protocols for wireless communication. The data store 408 may be used to store data. The data store 408 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 408 may incorporate electronic, magnetic, optical, and/or other types of storage media.

The memory 410 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 410 may incorporate electronic, magnetic, optical, and/or other types of storage media. Note that the memory 410 may have a distributed architecture, where various components are situated remotely from one another, but can be accessed by the processor 402. The software in memory 410 can include one or more software programs, each of which includes an ordered listing of executable instructions for implementing logical functions. In the example of FIG. 12, the software in the memory 410 includes a suitable operating system (O/S) 414 and programs 416. The operating system 414 essentially controls the execution of other computer programs, and provides scheduling, input-output control, file and data management, memory management, and communication control and related services. The programs 416 may include various applications, add-ons, etc. configured to provide end user functionality with the mobile device 400. For example, exemplary programs 416 may include, but not limited to, a web browser, social networking applications, streaming media applications, games, mapping and location applications, electronic mail applications, financial applications, and the like. In a typical example, the end user typically uses one or more of the programs 416 along with a network such as the system 100.

One aspect of the disclosure relates to a system and method of controlling a touch-based application. Such applications may be controlled via a touch-sensitive user interfaced on, for example, a mobile device. The system and/or method may provide for alternate control of the touch-based application via computer vision. This may facilitate gesture and/or image-based control of the touch-based application by the user. Such alternative control may enhance user experience if the output of the mobile device is being presented to the user via an external display device (e.g., a television). For example, the user may control the same touch-based applications on the mobile device controlled via touch during regular use from a distance (e.g., a viewing distance to the television, and/or other distances).

The mobile device may include a touchscreen, a video output port, a processor, and/or other components. The processor may be configured to execute one or more of a touchscreen driver module, a touch-based application module, a user recognition module, a gesture module, an input translation module, an overlay module, a display output module, and/or other modules.

The touchscreen driver module may be configured to receive output signals from the touchscreen. Based on the received output signals, the touchscreen driver module may be configured to generate command inputs that correspond to the received output signals.

The touch-based application module may be configured to generate visual information for display to the user via the touchscreen. The visual information may be accompanied by other sensory information (e.g., audio information, tactile information, and/or other information). The information generated by the touch-based application module may present a game to the user, may provide the user with access to files and/or documents stored on the mobile device, may provide the user with access to a network (e.g., the Internet), and/or provide other functionality. The touch-based application may be configured such that operation of the application module may be controlled by the user via the command inputs.

The user recognition module may be configured to generate information related to the position and/or body position of the user based on image information representing the user. The image information may be captured by an image capture device. The image capture device may be associated with the mobile device, with the external display device, with the docking station for the mobile device, external to the other components of the system, and/or associated with other components of the system. The user recognition module may be configured to locate one or more body parts of the user in the image information.

The gesture module may be configured to identify one or more gestures made by the user. The gesture module may identify the gesture(s) based on the image information representing the user, based on the information related to position and/or body position determined by the user recognition module, and/or based on other information. The gestures recognized by the gesture module may include gestures that correspond to command inputs to the touch-based application module.

The input translation module may be to translate the position and/or body position of the user, and/or the gestures identified by the gesture module, into control inputs to the touch-based application module. As such, the input translation module may be configured to spoof the control inputs typically generated by the touchscreen driver in order to facilitate gesture-based control of the touch-based application module.

The display output module may be configured to output the visual information generated by the touch-based application module to the external display device through the video output port. Responsive to the gesture-based control being used to control touch-based application module, this facilitates control over the content and/or application being presented on the external display device by the user through gesture-based control.

The modules may be configured to operate in a first mode and second mode. In the first mode, the input translation module may not generate command inputs. In the second mode, the input translation module generates command inputs based on the identified position, body position, and/or gestures. This may enable the mobile device to be controlled via touch during typical operation, and via gesture if the mobile device is coupled to an external display device for output. In some implementations, the mobile device may be switched automatically from the first mode to the second mode responsive to a determination that the mobile device has been coupled to an external display device.

The overlay module may be configured to generate overlay content based on user position, body position, and/or gestures. The overlay content may be superimposed over the visual information generated by the touch-based application module. The overlay content may convey one or more of current body position, the current position of one or more (e.g., two or more) specific body parts, and/or other information. The overlay content may provide feedback to the user as to current body position and/or gesture to enhance non-contact control over the touch-based application by the user. The overlay content may include one or more of visual information, audio information, tactile information, and/or other information.

The docking station may be configured to connect a mobile device with an external display device. The docking station may include one or more of a device seat, an image capture device, an image information port, a mobile device video port, a display device video port, a display device video port, a power supply connector, a power supply port, and/or other components.

The device seat may be configured to mechanically hold and support the mobile device in place on the docking station. The device seat may be configured such that responsive to the mobile device being docked at the docking station, the mobile device interfaces with the appropriate ports associated with the docking station.

The image capture device may be carried by and/or integrated with the docking station. The image capture device may be configured to capture image information representing a user.

The image information port may be configured to couple the image capture device to the mobile device. The image information port may facilitate the transfer of image information from the image capture device to the mobile device.

The mobile device video port may be configured to couple with the mobile device. The display device video port may be configured to couple with the external display device. The mobile device video port and the display device video port may facilitate the communication of visual information (e.g., application output) from the mobile device to the external display device for display on the external display device.

The power supply connector may be configured to removably connect with an external power supply. The power provision port may be configured to couple with the mobile device. The power supply connector and the power provision port may be configured to couple the mobile device to the external power supply to facilitate the provision of power from the external power supply to the mobile device.

It will be appreciated that some exemplary embodiments described herein may include one or more generic or specialized processors ("one or more processors") such as microprocessors, digital signal processors, customized processors, and field programmable gate arrays (FPGAs) and unique stored program instructions (including both software and firmware) that control the one or more processors to implement, in conjunction with certain non-processor circuits, some, most, or all of the functions of the methods and/or systems described herein. Alternatively, some or all functions may be implemented by a state machine that has no stored program instructions, or in one or more application specific integrated circuits (ASICs), in which each function or some combinations of certain of the functions are implemented as custom logic. Of course, a combination of the aforementioned approaches may be used. Moreover, some exemplary embodiments may be implemented as a non-transitory computer-readable storage medium having computer readable code stored thereon for programming a computer, server, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A computer-implemented method, comprising:
   providing output from a touch-based device to an external display connected to the touch-based device;
   detecting, via a sensor external from the touch-based device and directly facing a user and monitoring the user's body, gestures comprising in-air hand movements and in-air body movements from a user located away from and not physically touching the touch-based device; and
   translating the detected gestures into appropriate touch commands based on the in-air hand movements and appropriate tilt commands based on the in-air body movements for the touch-based device to control an application on the touch-based device without physically interacting with the touch-based device, wherein the application is configured to be controlled by the detected gestures, and wherein the detected gestures are utilized in lieu of actual touch commands on the touch-based device and actual tilt commands through an accelerometer on the touch-based device without modifying the application, and wherein the translating comprises:
   mapping the in-air hand movements to touch gestures meaningful to the touch-based device for the touch commands; and
   mapping the in-air body movements to accelerometer readings meaningful to the touch-based device for the tilt commands.

2. The computer-implemented method of claim 1, further comprising:
   modeling user behavior to provide assistance in mapping the gestures to the appropriate commands for the touch-based device; and
   constraining the gestures based on the modeling and settings.

3. The computer-implemented method of claim 1, further comprising:
   locating one or more body parts of the user; and
   recognizing the gestures based on the location or locations of the one or more body parts.

4. The computer-implemented method of claim 1, further comprising:
   presenting an outline of the user or a cursor on the external display.

5. The computer-implemented method of claim 1, wherein the touch-based device is input into a dock to perform the providing, the detecting, and the translating, wherein the dock is communicatively coupled to the external display and to a sensor for the detecting.

6. A system, comprising:
   a network interface, a data store, and a processor, each communicatively coupled therebetween; and
   memory storing instructions that, when executed, cause the processor to:
   provide output from a touch-based device to an external display connected to the touch-based device;
   detect, via a sensor external from the touch-based device and directly facing a user and monitoring the user's body, gestures comprising in-air hand movements and in-air body movements from a user located away from and not physically touching the touch-based device; and
   translate the detected gestures into appropriate touch commands for the touch-based device based on the in-air hand movements and appropriate tilt commands based on the in-air body movements to control an application on the touch-based device without physically interacting with the touch-based device, wherein the application is configured to be controlled by the detected gestures, and wherein the detected gestures are utilized in lieu of actual touch commands on the touch-based device and actual tilt commands through an accelerometer on the touch-based device without modifying the application, wherein the detected gestures are translated by:
   mapping the in-air hand movements to touch gestures meaningful to the touch-based device for the touch commands; and
   mapping the in-air body movements to accelerometer readings meaningful to the touch-based device for the tilt commands.

7. The system of claim 6, wherein the instructions, when executed, further cause the processor to:
   modeling user behavior to provide assistance in mapping the gestures to the appropriate commands for the touch-based device; and
   constraining the gestures based on the modeling and settings.

8. The system of claim 6, wherein the instructions, when executed, further cause the processor to:
  locating one or more body parts of the user; and
  recognizing the gestures based on the location or locations of the one or more body parts.

9. The system of claim 6, wherein the instructions, when executed, further cause the processor to:
  present an outline of the user or a cursor on the external display.

10. A non-transitory computer readable medium with software stored thereon, the software comprising instructions executable by a system, and in response to such execution causes the system to perform operations comprising:
  providing output from a touch-based device to an external display connected to the touch-based device;
  detecting, via a sensor external from the touch-based device and directly facing a user and monitoring the user's body, gestures comprising in-air hand movements and in-air body movements from a user located away from and not physically touching the touch-based device; and
  translating the detected gestures into appropriate touch commands based on the in-air hand movements and appropriate tilt commands based on the in-air body movements for the touch-based device to control an application on the touch-based device without physically interacting with the touch-based device, wherein the application is configured to be controlled by the detected gestures, and wherein the detected gestures are utilized in lieu of actual touch commands on the touch-based device and actual tilt commands through an accelerometer on the touch-based device without modifying the application, and wherein the translating comprises:
    mapping the in-air hand movements to touch gestures meaningful to the touch-based device for the touch commands; and
    mapping the in-air body movements to accelerometer readings meaningful to the touch-based device for the tilt commands.

11. The non-transitory computer readable medium of claim 10, wherein the instructions executable by the system, and in response to such execution further causes the system to perform operations comprising:
  modeling user behavior to provide assistance in mapping the gestures to the appropriate commands for the touch-based device; and
  constraining the gestures based on the modeling and settings.

12. The non-transitory computer readable medium of claim 10, wherein the instructions executable by the system, and in response to such execution further causes the system to perform operations comprising:
  locating one or more body parts of the user; and
  recognizing the gestures based on the location or locations of the one or more body parts.

13. The non-transitory computer readable medium of claim 10, wherein the instructions executable by the system, and in response to such execution further causes the system to perform operations comprising:
  presenting an outline of the user or a cursor on the external display.

* * * * *